US011188203B2

(12) United States Patent
Li et al.

(10) Patent No.: US 11,188,203 B2
(45) Date of Patent: Nov. 30, 2021

(54) METHOD FOR GENERATING MULTIMEDIA MATERIAL, APPARATUS, AND COMPUTER STORAGE MEDIUM

(71) Applicant: BEIJING DAJIA INTERNET INFORMATION TECHNOLOGY CO., LTD., Beijing (CN)

(72) Inventors: Qian Li, Beijing (CN); Qian Shao, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/138,178

(22) Filed: Dec. 30, 2020

(65) Prior Publication Data
US 2021/0223924 A1    Jul. 22, 2021

(30) Foreign Application Priority Data
Jan. 21, 2020    (CN) .......................... 202010072542.5

(51) Int. Cl.
*G06F 3/0482*    (2013.01)
*G06F 3/0484*    (2013.01)

(52) U.S. Cl.
CPC .......... *G06F 3/0484* (2013.01); *G06F 3/0482* (2013.01)

(58) Field of Classification Search
CPC .................................................. G06F 3/0482
See application file for complete search history.

(56) References Cited

U.S. PATENT DOCUMENTS

| 8,601,372 | B1 | 12/2013 | Gentile et al. |
| 8,634,875 | B1 * | 1/2014 | Narayanachar ... H04M 1/72448 455/566 |

(Continued)

FOREIGN PATENT DOCUMENTS

| CN | 106527891 A | 3/2017 |
| CN | 106791182 A | 5/2017 |

(Continued)

OTHER PUBLICATIONS

Fatima Wahab, "How to Save a Post to Drafts in Instagram for Editing Later", available at <<https://www.addictivetips.com/ios/how-to-save-a-post-to-drafts-in-instagram/>>, archived on Sep. 23, 2016 on wayback machine: <21 https//web.archive.org>>, 7 pages. (Year: 2016).*

(Continued)

*Primary Examiner* — Daniel Rodriguez
(74) *Attorney, Agent, or Firm* — Foley & Lardner LLP

(57) ABSTRACT

The disclosure relates to a method for generating a multimedia material. The method includes displaying an album interface in response to receiving a first operation. The album interface includes a draft box interface switching control of the application and at least one terminal album management control. The method includes displaying a draft box interface in response to receiving a second operation. The draft box interface includes at least one first multimedia material belonging to a draft box of the application. The method includes determining a first material in response to receiving a first selection operation in the draft box interface, the first selection operation triggered on the first multimedia material from the user; and generating a first target multimedia material based on the first material in response to receiving a first determination operation, the first determination operation triggered on the first material.

17 Claims, 7 Drawing Sheets

(56) References Cited

U.S. PATENT DOCUMENTS

| | | | |
|---|---|---|---|
| 9,377,991 B1* | 6/2016 | Rapport | G06F 16/438 |
| 2003/0093493 A1* | 5/2003 | Watanabe | H04N 1/00188 |
| | | | 709/217 |
| 2005/0134939 A1 | 6/2005 | Ikeda et al. | |
| 2006/0288304 A1* | 12/2006 | Nomoto | G06F 16/168 |
| | | | 715/781 |
| 2007/0186178 A1* | 8/2007 | Schiller | G06F 3/0486 |
| | | | 715/769 |
| 2007/0186189 A1* | 8/2007 | Schiller | G06F 16/54 |
| | | | 715/838 |
| 2008/0180457 A1 | 7/2008 | Yamazaki | |
| 2009/0164923 A1* | 6/2009 | Ovi | G06F 3/04817 |
| | | | 715/764 |
| 2009/0300139 A1* | 12/2009 | Shoemaker | G06Q 10/10 |
| | | | 709/217 |
| 2011/0126156 A1* | 5/2011 | Krishnaraj | G06F 3/04842 |
| | | | 715/828 |
| 2013/0007667 A1* | 1/2013 | Sauve | G06F 16/54 |
| | | | 715/838 |
| 2013/0055142 A1* | 2/2013 | Li | G06F 16/168 |
| | | | 715/777 |
| 2013/0132847 A1* | 5/2013 | Chen | H04N 1/0045 |
| | | | 715/731 |
| 2013/0238724 A1* | 9/2013 | Cunningham | G06F 3/04842 |
| | | | 709/206 |
| 2014/0047413 A1* | 2/2014 | Sheive | G06F 8/30 |
| | | | 717/110 |
| 2015/0039709 A1* | 2/2015 | Jacobs | H04L 51/10 |
| | | | 709/206 |
| 2015/0179219 A1* | 6/2015 | Gao | G06T 7/254 |
| | | | 386/278 |
| 2015/0346854 A1* | 12/2015 | Lee | G06F 3/041 |
| | | | 345/173 |
| 2016/0104052 A1* | 4/2016 | Kim | G09G 5/14 |
| | | | 382/176 |
| 2016/0110830 A1 | 4/2016 | Shapira | |
| 2016/0125062 A1 | 5/2016 | Karlsson et al. | |
| 2017/0038922 A1* | 2/2017 | Eim | G06F 3/04883 |
| 2018/0032203 A1* | 2/2018 | Sepulveda | G06F 1/1615 |
| 2018/0217731 A1 | 8/2018 | Ishida | |
| 2018/0341341 A1* | 11/2018 | Sharma | G06F 3/04886 |
| 2018/0356945 A1* | 12/2018 | Gannon | H04N 21/41407 |
| 2019/0034061 A1* | 1/2019 | Liu | H04M 1/72403 |
| 2019/0230467 A1* | 7/2019 | Williams | G08B 21/10 |
| 2020/0356590 A1* | 11/2020 | Clarke | G06F 16/438 |

FOREIGN PATENT DOCUMENTS

| | | |
|---|---|---|
| CN | 107085612 | 8/2017 |
| CN | 107241644 A | 10/2017 |
| CN | 108471554 A | 8/2018 |
| CN | 108616696 A | 10/2018 |
| CN | 109451245 A | 3/2019 |
| CN | 109547711 A | 3/2019 |
| CN | 109977241 A | 7/2019 |
| CN | 110069181 A | 7/2019 |
| CN | 110580508 A | 12/2019 |
| EP | 2 852 135 A1 | 3/2015 |
| EP | 3 160 050 A1 | 4/2017 |
| EP | 3 333 688 A1 | 6/2018 |

OTHER PUBLICATIONS

Anonymous, "How to clip and merge videos with your iPhone", Dec. 22, 2020, 10 pages.

Chinese Office Action dated Aug. 18, 2020, from application No. 202010072542.5.

Notification to Grant Patent Right for Invention dated Oct. 30, 2020, for Chinese Application No. 202010072542.5.

Extended European Search Report dated Jun. 7, 2021, from application No. 21152528.2, 10 Pages.

* cited by examiner

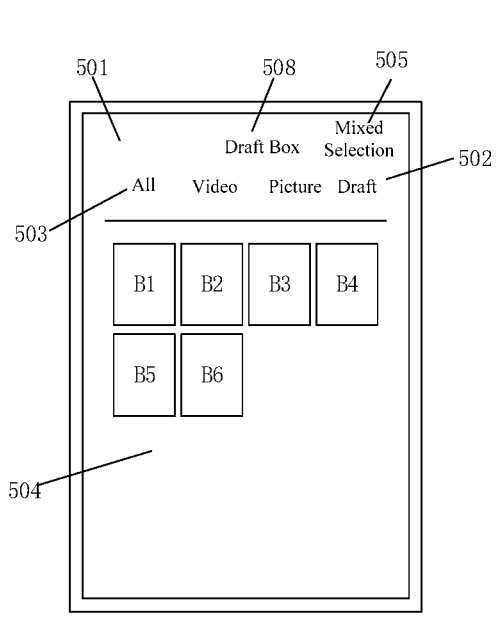
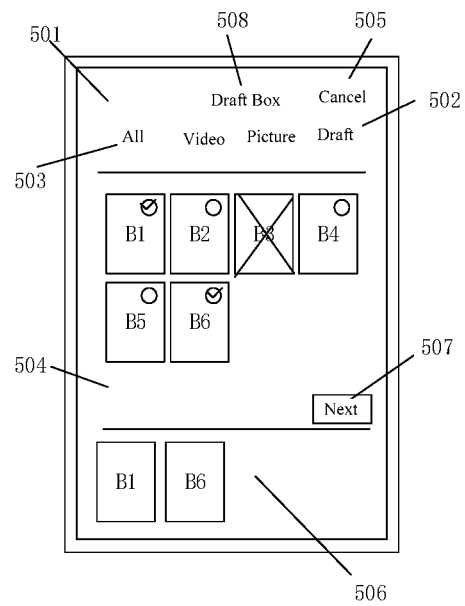
FIG.8    FIG.9
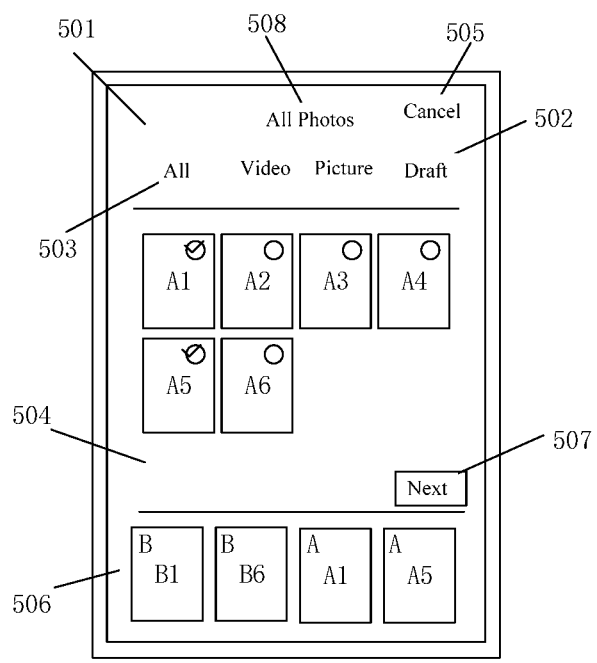
FIG.10

METHOD FOR GENERATING MULTIMEDIA MATERIAL, APPARATUS, AND COMPUTER STORAGE MEDIUM

CROSS-REFERENCE TO RELATED APPLICATIONS

This application claims the priority of the Chinese Patent Application No. 202010072542.5, filed with China National Intellectual Property Administration on Jan. 21, 2020, the disclosure of which is herein incorporated by reference in its entirety.

TECHNICAL FIELD

The disclosure relates to the field of short video technology, and in particular to a method, apparatus and computer storage medium for generating a multimedia material.

BACKGROUND

In the process of generating multimedia materials, users often need to use multimedia materials from different sources to generate new multimedia materials such as using multimedia materials in album of a terminal device to generate new multimedia materials, or using multimedia materials in draft box of an application in the terminal device to generate new multimedia materials. Since interface of album in the terminal device and interface of draft box in the application are independent of each other, users need to switch frequently between these interfaces, which is cumbersome and inefficient.

SUMMARY

According to one aspect of the implementations of the disclosure, a method for generating a multimedia material is provided. The method for generating a multimedia material includes displaying an album interface in response to receiving a first operation, the first operation triggered on an album interface display control in an interface of an application in a terminal device. The album interface includes a draft box interface switching control of the application and at least one terminal album management control. The method includes displaying a draft box interface in response to receiving a second operation, the second operation triggered on the draft box interface switching control. The draft box interface includes at least one first multimedia material belonging to a draft box of the application; determining a first material in response to receiving a first selection operation in the draft box interface, the first selection operation triggered on the first multimedia material from the user. The method includes generating a first target multimedia material based on the first material in response to receiving a first determination operation, the first determination operation triggered on the first material.

According to another of the implementations of the disclosure, an apparatus for generating a multimedia material is provided. The apparatus for generating a multimedia material includes a first display module configured to display an album interface in response to receiving a first operation, the first operation triggered on an album interface display control in an interface of an application in a terminal device. The album interface includes a draft box interface switching control of the application and at least one terminal album management control; a second display module configured to display a draft box interface in response to receiving a second operation, the second operation triggered on the draft box interface switching control. The draft box interface includes at least one first multimedia material belonging to a draft box of the application; a first determination module configured to determine a first material in response to receiving a first selection operation in the draft box interface, the first selection operation triggered on the first multimedia material from the user; and a first generation module configured to generate a first target multimedia material based on the first material in response to receiving a first determination operation, the first determination operation triggered on the first material.

According to yet another aspect of the disclosure, there is provided a device for generating a multimedia material. The device includes a processor and a memory for storing instructions executable by the processor. The processor is configured to implement the method for generating a multimedia material as described in any one of the implementations of the first aspect.

According to yet another aspect of the disclosure, there is provided a computer storage medium having a computer instruction stored thereon, when the computer instruction being executed by a processor of a device for generating multimedia materials, enable the device for generating multimedia materials to implement the method for generating a multimedia material as described in any one of the implementations of the first aspect.

According to yet another aspect of the implementations of the disclosure, there is provided a computer program product including instructions, the instructions are executed by the computer, so that the computer executes the method for processing generating a multimedia material described in any one of the implementations of the first aspect.

It should be understood that the above general description and the following detailed description are only example and explanatory, and cannot limit the disclosure.

BRIEF DESCRIPTION OF THE DRAWINGS

The drawings herein are incorporated into the specification and constitute a part of the specification, show implementations that conform to the disclosure, and are used with the specification to explain the principle of the disclosure.

FIG. 8 is a schematic diagram showing an album interface in another terminal device according to some example implementations;

FIG. 9 is a schematic diagram showing an album interface in another terminal device according to some example implementations;

FIG. 10 is a schematic diagram showing another album interface in a terminal device according to some example implementations;

DETAILED DESCRIPTION

In order to enable those of ordinary skill in the art to better understand the technical solutions of the disclosure, the technical solutions in the implementations of the disclosure will be described clearly and completely with reference to the accompanying drawings.

It should be noted that the terms "first" and "second" in the specification and claims of the disclosure and the above-mentioned drawings are used to distinguish similar objects, and not necessarily used to describe a specific sequence or order. It should be understood that the data used in this way can be interchanged under appropriate circumstances so that the implementations of the disclosure described herein can be implemented in an order other than those illustrated or described herein. The implementation manners described in the following example implementations do not represent all implementation manners consistent with the disclosure. Rather, they are merely examples of devices and methods consistent with some aspects of the disclosure as detailed in the appended claims.

In order to more clearly introduce the technical solution of the disclosure, an example of an interface of an application in the prior art is described first.

Figure 1:
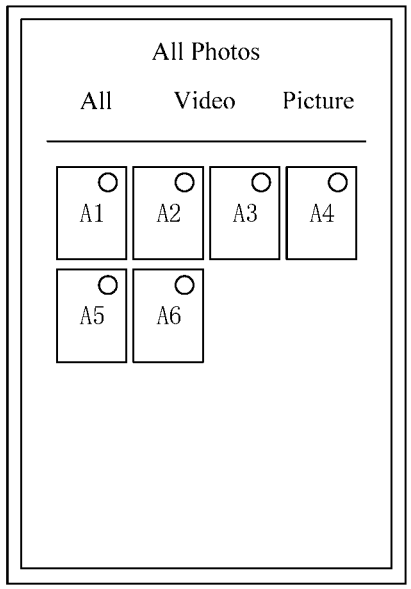
FIG. 1 is a schematic diagram of an album interface in a terminal device in the prior art.
Figure 2:
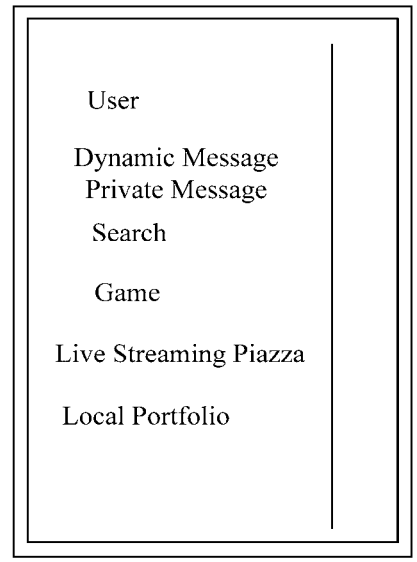
FIG. 2 is a schematic diagram of an interface of an application in a terminal device in the prior art.

FIG. 1 is a schematic diagram of an album interface in a terminal device in the prior art. As shown in FIG. 1, a user can enter the album interface shown in FIG. 1 through an entry of the album interface in an application' interface, select a multimedia material belonging to an album in the terminal device, and edit the multimedia material in the local album. FIG. 2 is a schematic diagram of an interface of an application in a terminal device in the prior art. As shown in FIG. 2, the user can enter a draft box interface of the application through an entry (the label 'Local Portfolio' as shown in FIG. 2) of a draft box in the application' interface, and select a multimedia material belonging to the draft box of the application for editing. Combining FIG. 1 and FIG. 2, the user can only select, in the album interface, the multimedia material belonging to the local album in the terminal device for editing, or enter, through the entry of the draft box in the application' interface, the draft box interface of the application and then select the multimedia material belonging to the draft box of the application for editing. When the user selects, in the album interface, the multimedia materials belonging to the album in the terminal device and wants to use the multimedia material belonging to draft box of the application, he can only exit the album interface, enter the draft box interface and then select the multimedia material belonging to the draft box of the application for editing. In addition, the user cannot select the multimedia material belonging to the album of terminal device and the multimedia material belonging to the draft box of the application at the same time for mixed editing. What the user can do is first save the multimedia material belonging to the draft box of the application to the album of the terminal device, and then making selections, which make operation paths of the multimedia materials tedious and complicated.

Figure 3:
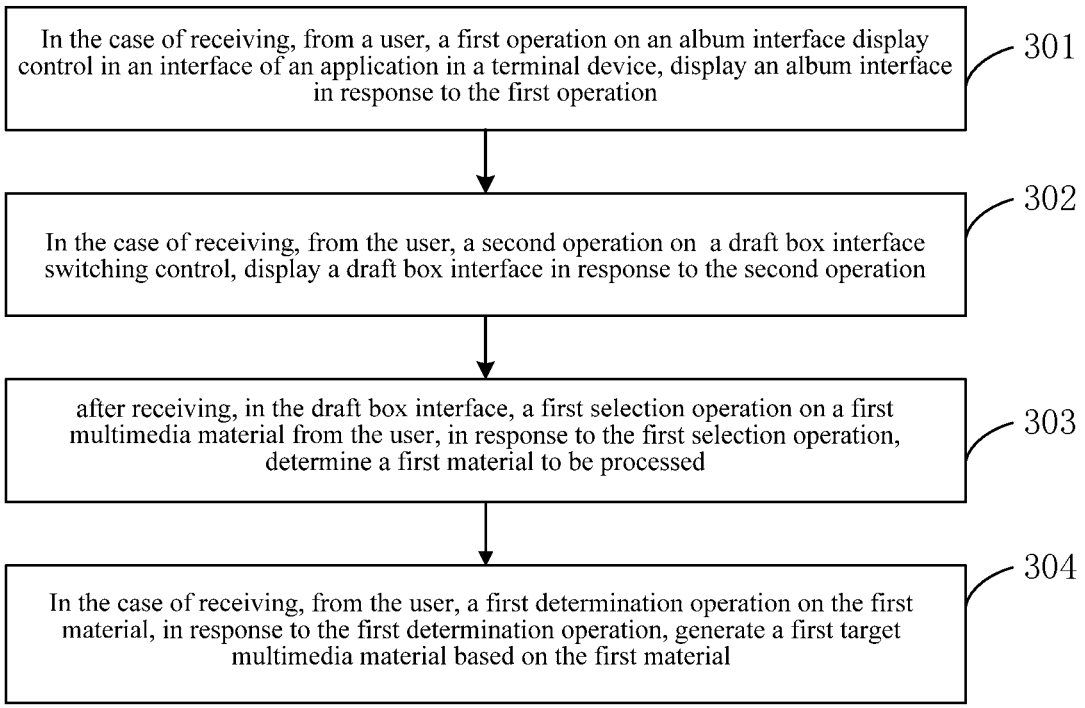
FIG. 3 is a flow chart showing a method for generating a multimedia material according to some example implementations.

FIG. 3 is a flow chart of a method for generating a multimedia material according to some example implementations. Referring to FIG. 3, the method for generating a multimedia material according to the implementations can be applied to the generation of the multimedia material, which can simplify user operations and improve the production efficiency of multimedia materials. The method for generating the multimedia material provided in the implementations can be executed by an apparatus for generating the multimedia material. The apparatus for generating the multimedia material is usually implemented in software and/or hardware. The apparatus can be set in a terminal device. The method generating the multimedia material includes the following operations.

In operation 301, in the case of receiving, from a user, a first operation triggered on an album interface display control in an interface of an application of the terminal device, an album interface is displayed in response to the first operation.

The album interface includes a draft box interface switching control of the application and at least one terminal album management control.

Figure 4:
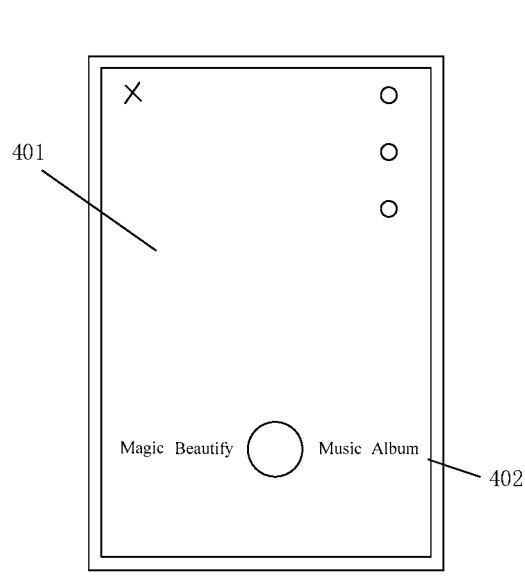
FIG. 4 is a schematic diagram showing an interface of an application in a terminal device according to some example implementations.

FIG. 4 is a schematic diagram showing an interface of an application in a terminal device according to some example implementations. As shown in FIG. 4, controls such as a shooting button, a music label, and a beautification label can be set in the interface 401 of the application. The user can operate different controls to achieve different functions and create a multimedia material. The interface 401 of the application is provided with the album interface display control 402, such as label 'Album' in lower right corner of the application' interface 401. The specific form of the album interface display control 402 and the specific position of the album interface display control 402 in the application' interface 401 can be set according to requirements, which are not limited in implementations.

In implementations, the album interface display control 402 is used to receive the first operation from the user, so as to open the album interface. The first operation may be, for example, an operation of clicking the album interface display control 402. After receiving the operation of the user clicking the album interface display control 402, the terminal device may display the album interface in response to the first operation. The specific form of the first operation and the method of terminal device displaying the album interface in response to the first operation can be set according to requirements, which are not limited in implementations.

Figure 5:
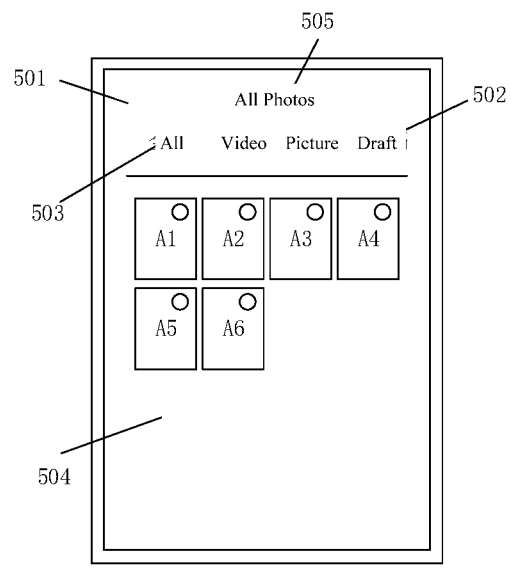
FIG. 5 is a schematic diagram showing an album interface in a terminal device according to some example implementations.

FIG. 5 is a schematic diagram showing an album interface in a terminal device according to some example implementations. The album interface 501 includes a draft box interface switching control 502 of the application, such as label 'Draft' shown in FIG. 5, and at least one terminal album management control 503, such as labels 'All', 'Video' and 'Picture' shown in FIG. 5. The draft box interface switching control 502 and the terminal album management control 503 can be controls such as labels or buttons. The specific forms of the draft box interface switching control 502 and the terminal album management control 503, the specific positions of the draft box interface switching control 502 and the terminal album management control 503 in the album interface 501, and the specific number of terminal album management controls 503 can be set according to requirements, which are not limited in implementations.

In operation 302, in the case of receiving, from the user, a second operation triggered on the draft box interface switching control, a draft box interface is displayed in response to the second operation.

Among them, the draft box interface includes a first multimedia material belonging to a draft box of the application. The second operation, for example, may be an operation of clicking the draft box interface switching control 502, and the specific form of the second operation may be set according to requirements, which is not limited in the implementations.

Figure 6:
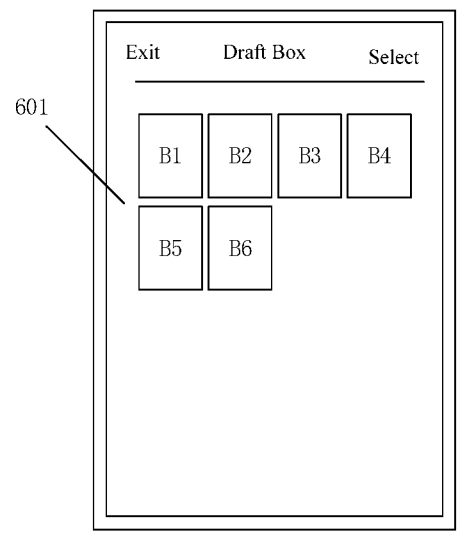
FIG. 6 is a schematic diagram showing a draft box interface in a terminal device according to some example implementations.

In implementations, after receiving the second operation of the user, the terminal device may display the draft box interface in response to the second operation. FIG. 6 is a schematic diagram showing a draft box interface in a terminal device according to some example implementations. In conjunction with FIG. 5, when the user clicks the label 'Draft', the terminal device can display the draft box interface 601 in response to the user's click operation, and then first multimedia materials (B1 to B6) belonging to the draft box of the application are displayed in the draft box interface 601. The method of the terminal device displaying the draft box interface in response to the second operation can be set according to requirements. For example, the draft box interface may be displayed after the album interface is closed, or the draft box interface may be displayed directly in a certain area of the album interface. These are not limited in implementations.

In operation 303, after receiving, in the draft box interface, a first selection operation triggered on the first multimedia material from the user, a first material to be processed is determined in response to the first selection operation.

The first selection operation may be, for example, a click operation triggered on the first multimedia material in the album interface. The specific form of the first selection operation can be set according to requirements, which is not limited in the implementations.

Combing with FIG. 6, the user can click on one of multiple first multimedia materials (B1 to B6) in the draft box interface 601, or click a number of them consecutively. After receiving the user's click operation by the draft box interface 601, the terminal device determines a first multimedia material clicked by the user as the first material to be processed, in response to the user's click operation. The specific processes of the draft box interface receiving the user's first selection operation triggered on the first multimedia material, and determining the first material to be processed in response to the user's first selection operation can refer to the prior art, which is not limited in the implementations.

In operation 304, in the case of receiving, from the user, a first determination operation triggered on the first material to be processed, a first target multimedia material is generated based on the first material to be processed, in response to the first determination operation.

In the implementations, after determining the first material to be processed (for example, the first multimedia material B1) in response to the user's first selection operation, the terminal device may enter a editing interface in response to the first determination operation of the user, so as to edit the first multimedia material B1 to generate the first target multimedia material. The process of generating the first target multimedia material by the terminal device according to the first material to be processed may refer to the process of generating the target multimedia material by the terminal device according to the multimedia material selected by the user in the prior art, which is not limited in the implementations.

In actual use, the draft box interface can also include other controls, such as the label 'Exit' shown in FIG. 6. After receiving the user's click operation on the label 'Exit' by the draft box interface, the terminal device can exit the draft box interface, in response to the user's click operation.

In some implementations, the method includes: in the case of receiving, from a user, a first operation triggered on an album interface display control in an interface of an application in the terminal device, displaying an album interface including a draft box interface switching control of the application, in response to the first operation; in the case of receiving, from the user, a second operation triggered on the draft box interface switching control, displaying a draft box interface including a first multimedia material belonging to the draft box of the application, in response to the second operation; after receiving, in the draft box interface, a first selection operation triggered on the first multimedia material, determining a first material to be processed in response to the first selection operation; in the case of receiving, from the user, a first determination operation triggered on the first material to be processed, generating a first target multimedia material based on the first material to be processed, in response to the first determination operation. By setting the draft box interface switching control the application in the album interface, in the case of receiving the first operation of the draft box interface switching control, the draft box interface of the application can be displayed, so that the user can directly enter the draft box interface of the application from the album interface. Furthermore, the first target multimedia material is generated based on the first multimedia material in the draft box interface, which is convenient for users to use the first multimedia material belonging to the draft box of the application to generate the target multimedia material, and improves the production efficiency of multimedia materials.

Figure 7:
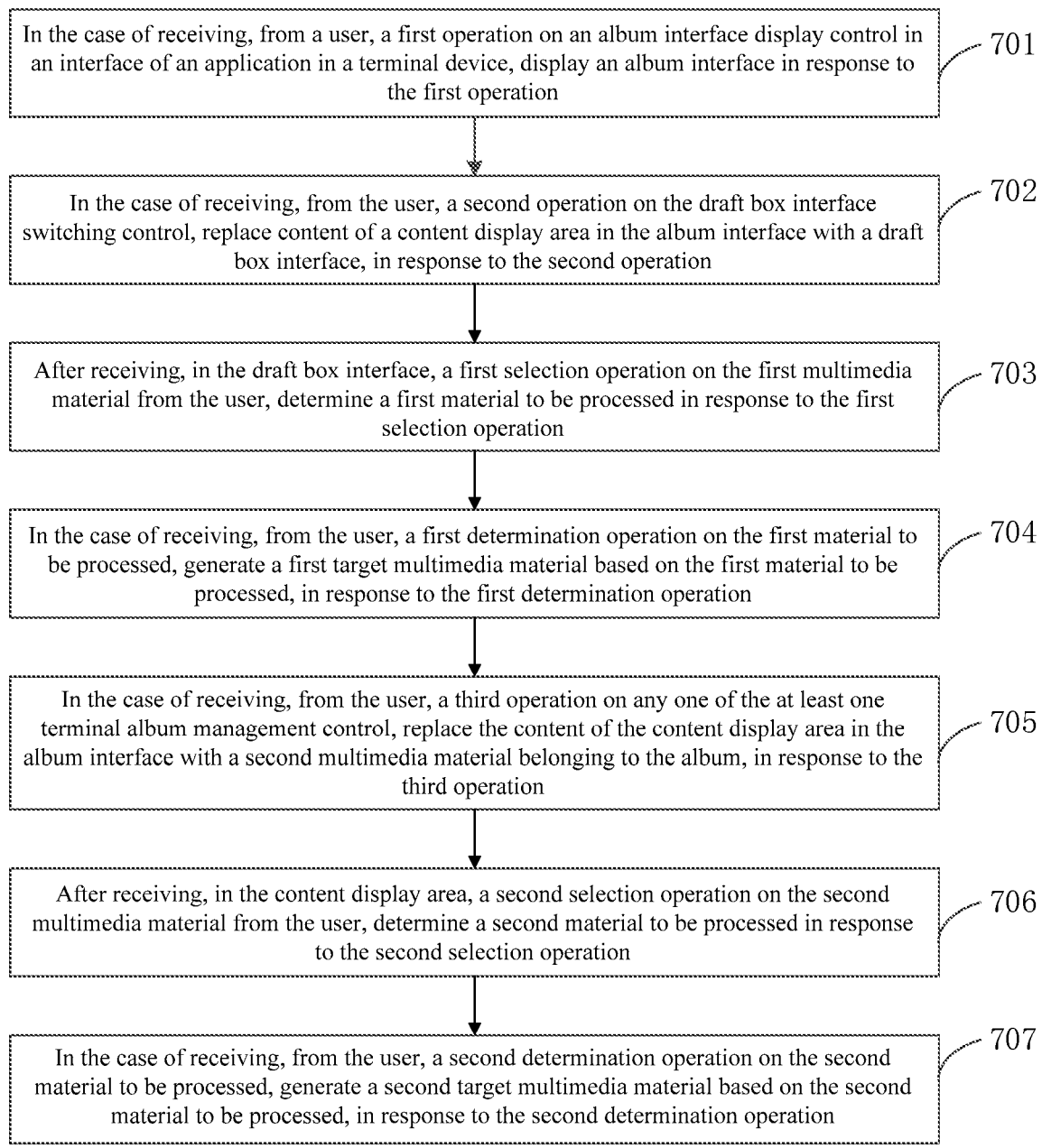
FIG. 7 is a flowchart showing another method for generating a multimedia material according to some example implementations.

FIG. 7 is a flowchart showing another method for generating a multimedia material according to some example implementations. The method may include the following operations.

In operation 701, in the case of receiving, from a user, a first operation triggered on an album interface display control in an interface of an application in a terminal device, an album interface is displayed in response to the first operation.

In operation 702, in the case of receiving, from the user, a second operation triggered on a draft box interface switching control, content of a content display area in the album interface is replaced with a draft box interface, in response to the second operation.

In some implementations, the draft box interface can be directly displayed in the album interface. FIG. 8 is a schematic diagram of an album interface in another terminal device according to some example implementations. The album interface 501 may include a content display area 504. After receiving, by the terminal device, the second operation triggered on a draft box interface switching control 502 from the user, the draft box interface can be directly displayed in the content display area 504. As shown in FIG. 8, the first multimedia material (B1 to B6) belonging to the draft box of the application can be displayed in the content display area 504 (i.e. the draft box interface). The method of displaying the draft box interface in the album interface can be set according to requirements, which is not limited in the implementations.

Among them, the replacing the content of the content display area in the album interface with the draft box interface can include the following.

In the case where the first multimedia material is stored in a local draft box folder of the terminal device, the first multimedia material is read from the draft box and the first multimedia material is displayed in the draft box interface.

In the case where the first multimedia material is stored in a server, the first multimedia material is obtained from the server and the first multimedia material is displayed in the draft box interface.

After obtaining the first multimedia material, the terminal device may store the first multimedia material in the local draft box folder of the terminal device or on the server. In the case of receiving, by the terminal device, the second operation triggered on the draft box interface switching control 502 from the user, if the first multimedia material is stored in the draft box folder, the terminal device can read the first multimedia material from the draft box folder in response to the second operation, and display the first multimedia material on the draft box interface. In the same way, if the first multimedia material is stored on the server, the terminal device can obtain the first multimedia material from the server in response to the second operation, and display the first multimedia material on the draft interface. Among them, the terminal device obtains the first multimedia material based on a storage position of the first multimedia material, and displays it on the draft box interface, which can facilitate the user to create based on the first multimedia materials in different storage positons and generate the target multimedia material.

In some implementations, the method may further include: in the case of receiving, from the user, the second operation triggered on the draft box interface switching control, displaying a selection mode switching control in the album interface; and after receiving, from the user, a fourth operation triggered on the selection mode switching control, switching a selection mode of the first multimedia material in the draft box interface in response to the fourth operation.

As shown in FIG. 8, after receiving, from the user, a click operation on the draft box interface switching control 502, in response to the user's click operation, the draft box interface is displayed by the terminal device in the content display area 504, and at the same time the selection mode switching control 505 (the label 'Mixed Selection') is displayed in the upper right corner of the album interface 501. The selection mode switching control 505 is used to switch the selection mode of the first multimedia material. The specific form of the selection mode switching control 505 and the specific position of the selection mode switching control 505 in the album interface 501 can be set according to requirements, which is not limited in the implementations.

After displaying the selection mode switching control 505, the fourth operation of the selection mode switching control 505 may be received from the user. For example, in case of receiving a click operation of the user clicking the selection mode switching control 505, and the selection mode of the first multimedia material is switched in response to the user's click operation. The specific form of the fourth operation can be set according to requirements, which is not limited in the implementations.

In the implementations, a state of the selection mode switching control may include a first state and a second state.

In the case that the selection mode switching control is in the first state, if the fourth operation is received, in response to the fourth operation, the selection mode switching control is switched to the second state, and the selection mode is switched to a mixed selection mode.

In the case that the selection mode switching control is in the second state, if the fourth operation is received, in response to the fourth operation, the selection mode switching control is switched to the first state, and the selection mode is switched to a single selection mode.

FIG. 9 is a schematic diagram showing an album interface in another terminal device according to some example implementations. As shown in FIG. 8 and FIG. 9, in the case of receiving, by the terminal device, the second operation triggered on the draft box interface switching control 502 from the user, the selection mode switching control 505 (the label 'Mixed Selection') is displayed in the album interface 501. When the selection mode switching control 505 is in the first state, if an operation that clicks the label 'Mixed Selection' in FIG. 8 is received from a user, the terminal device can switch the selection mode switching control 505 into the second state in response to the user's click operation (fourth operation), and the label 'Mixed Selection' is replaced with the label 'Cancel' as shown in FIG. 9, and at the same time the selection mode is switched to the mixed selection mode. As shown in FIG. 9, a check box is set on each of the first multimedia materials in the content display area 504, and the user can select multiple first multimedia materials through the check boxes to realize the mixed selection of multiple first multimedia materials. Conversely, when the selection mode switching control 505 is in the second state, if the fourth operation of the selection mode switching control 505 is received from the user, for example, an operation of the user clicking the label 'Cancel' in FIG. 9, the selection mode switching control 505 is switched to the first state, the label 'Cancel' in FIG. 9 is replaced with the label "Mixed Selection" in FIG. 8, and at the same time the selection mode is switched to the single selection and the check box on each of the first multimedia materials in the content display area 504 is deleted. Setting the selection mode switching control and switching the selection mode of the first multimedia material through the selection mode switching control can facilitate the user to perform different operations on the first multimedia materials in the draft box.

In operation 703, after receiving, in the draft box interface, a first selection operation triggered on the first multimedia material from the user, a first material to be processed is determined in response to the first selection operation.

In operation 704, in the case of receiving, from the user, a first determination operation triggered on the first material to be processed, a first target multimedia material is generated based on the first material to be processed, in response to the first determination operation.

In operation 705, in the case of receiving, from the user, a third operation triggered on any one of the at least one terminal album management control, the content of the content display area in the album interface is replaced with a second multimedia material belonging to the album, in response to the third operation.

The third operation may be an operation of clicking the terminal album management control, and the specific form of the third operation may be set according to requirements, which is not limited in the implementations.

In some implementations, the content display area 504 in the album interface 501 may display the draft box interface or the second multimedia material belonging to the album of the terminal device. As shown in FIG. 5, after receiving, by the terminal device, the third operation triggered on a terminal album management control from the user, the content displayed in the content display area is replaced with the second multimedia (A1 to A6) belonging to the album of the terminal device, in response to the third operation. Among them, the second multimedia material is a multimedia material in a terminal device, such as in an album of a mobile phone. After receiving the third operation, the terminal device can read the second multimedia material from an album folder of the terminal device in response to the third operation, and display the read second multimedia material (or multiple second multimedia materials) in the content display area 504. For example, in conjunction with FIG. 5 and FIG. 8, if the draft box interface (the first multimedia material) is displayed in the content display area 504, then the terminal device can replace the draft box interface (B1 to B6) with the read second multimedia materials (A1 to A6) after receiving the user's click on the label 'All'. The process of replacing the content displayed in the content display area with the second multimedia material belonging to the album of the terminal device can be set according to requirements, which is not limited in the implementations.

In operation 706, after receiving, in the content display area, a second selection operation triggered on the second multimedia material from the user, a second material to be processed is determined in response to the second selection operation.

The second selection operation may be a click operation on the second multimedia material in the content display area, and the specific form of the second selection operation may be set according to requirements, which is not limited in the implementations.

As shown in FIG. 5, when the second multimedia material (A1 to A6) belonging to the album of the terminal device is displayed in the content display area 504, the user can click on at least one of A1 to A6. After receiving the user's click operation in the content display area 504, the terminal device, in response to the user's click operation, determines the second multimedia material clicked by the user as the second material to be processed, such as the second multimedia materials A1 and A5.

In actual use, the processes of the content display area receiving the second selection operation, and the terminal device determining the material to be processed in response to the second selection operation can be set according to requirements, which is not limited in the implementations.

In operation 707, in the case of receiving, from the user, a second determination operation triggered on the second material to be processed, a second target multimedia material is generated based on the second material to be processed, in response to the second determination operation.

In some implementations, after determining the second material to be processed (for example, the second multimedia materials A1 and A5) in response to the user's second selection operation, the terminal device can enter an editing interface in response to the user's second determination operation, so as to edit the second multimedia materials A1 and A5 to generate the second target multimedia material. The process of generating the second target multimedia material by the terminal device according to the second material to be processed may refer to the process of generating the target multimedia material by the terminal device according to the multimedia material selected by the user in the prior art, which is not limited in the implementations.

In some implementations, after displaying the album interface, the method may further include: displaying an alternative area in the content display area; in response to determining the first material to be processed, displaying the first material to be processed in the alternative area; in response to determining the second material to be processed, displaying the second material to be processed in the alternative area; and in the case of receiving, from the user, a third determination operation triggered on the alternative area, in response to the third determination operation, generating a third target multimedia material based on the multimedia material displayed in the alternative area.

FIG. 10 is a schematic diagram showing an album interface in another terminal device according to some example implementations. As shown in FIG. 9 and FIG. 10, after receiving the first selection operation and determining first multimedia materials B1 and B6 as the first materials to be processed, the first multimedia materials B1 and B6 (i.e., the first materials to be processed) can be displayed in the alternative area 506 at the bottom of the album interface 501. After receiving the second selection operation and determining the second multimedia materials A1 and A5 as the second materials to be processed, the second multimedia materials A1 and A5 (i.e., the second materials to be processed) may be displayed in the alternative area 506. In the case of receiving the user's third determination operation triggered on the alternative area 506, in response to the third determination operation, a third target multimedia material is generated based on the multimedia materials (i.e., A1, A5, B1, and B6) displayed in the alternative area 506.

In some implementations, the terminal device may enter the editing interface in response to the user's third determination operation, so as to edit the multimedia materials displayed in the alternative area 506 and generate the third target multimedia material. For example, in response to the user's click operation on the control 507, the terminal device may enter the editing interface, so as to edit the multimedia materials displayed in the alternative area, and generate the third target multimedia material. The process of generating the third target multimedia material by the terminal device according to the multimedia materials displayed in the alternative area may refer to the prior art, which is not described in detail in the implementations.

It should be noted that the alternative area may be displayed in the content display area after the album interface is displayed and the user's trigger operation is received by the terminal device, or after the first material to be processed is determined and the terminal device responds to the user's third operation, or after the second material to be processed is determined and the terminal device responds to the user's second operation. The display method of the alternative area can be set according to requirements, which is not limited in the implementations. At the same time, only the first material to be processed can be determined, and then only the first material to be processed can be displayed in the alternative area, or only the second material to be processed can be determined, and then only the second material to be processed can be displayed in the alternative area, or the first material to be processed and the second material to be processed can be displayed in the alternative area at the same time, which is not limited in the implementations.

In some implementations, the method may further include: adding a source tag corresponding to a source of the multimedia material displayed in the alternative area onto the multimedia material displayed in the alternative area, based on the source of the multimedia material displayed in the alternative area.

In some implementations, when the terminal device displays the multimedia material in the alternative area, a source tag may be added onto the multimedia material to facilitate the user to distinguish the multimedia material displayed in the alternative area. For example, the terminal device can determine a source of the multimedia material while reading the multimedia material, select the source tag according to the source of the multimedia material, and set the corresponding source tag for the multimedia material displayed in the alternative area. As shown in FIG. 10, when the terminal device reads the second multimedia material A1 from the album folder, it can determine the source of the second multimedia material A1 and set a tag A for the second multimedia material A1. Similarly, when the terminal device reads the first multimedia material B6 from the application draft folder, it can determine the source of the first multimedia material B6 and set a tag B for the first multimedia material B6. The specific form of the tag can be set according to requirements, which is not limited in the implementations.

In some implementations, the first multimedia material belonging to the application draft box or the second multimedia material belonging to the album of the terminal device can be displayed on the album interface. After receiving, from user, a first selection operation triggered on the first multimedia material, the terminal device may determine a first material to be processed in response to the first selection operation, and a first target multimedia material is generated according to the first material to be processed. Alternatively, after receiving, from user, a second selection operation triggered on the second multimedia material, the terminal device may determine a second material to be processed in response to the second selection operation, and a second target multimedia material is generated according to the second material to be processed. The method mentioned above can solve the problems that users need to switch frequently between the album interface and the draft box interface when selecting the first multimedia material belonging to the application draft box and the second multimedia material belonging to the album of the terminal device, thus improve the generating efficiency of the multimedia material. Furthermore, the determined to-be-processed first material and to-be-processed second material can be simultaneously displayed in the alternative area, and the third target multimedia material is generated according to the first material to be processed and/or the second material to be processed in the alternative area, thus realizing the mixed selection of the first multimedia material and the second multimedia material, providing users with more multimedia materials at the same time, and improving the user's creative experience.

In some implementations, a selection for a preset kind of first multimedia material is supported by each state of the selection mode switching control, and the method may further include: in any state, a first multimedia material that does not belong to the preset kind corresponding to the state among the first multimedia materials is set as a prohibition selection.

In some implementations, in response to obtaining the first multimedia materials from the local draft box folder or the server, the terminal device can determine the type of each of first multimedia materials. For example, it is determined that the first multimedia material is a video, a picture, and an atlas. At the same time, the first multimedia material in the content display area is set based on the state of the selection mode switching control. For example, as shown in FIG. 9, it may be preset that the first multimedia material (B3) of the atlas type does not belong to the multimedia material of the preset type corresponding to a second state. When the selection mode switching control is in the second state, if the first multimedia material (B3) is displayed in the display area, then a prohibition tag can be set on the first multimedia material (B3) and the first multimedia material (B3) can be set as a multimedia material to be forbidden to select (i.e., in the prohibition selection state). The method of setting the multimedia material as be in the prohibition selection state can be set according to requirements, which is not limited in the implementations. The selection state of the corresponding first multimedia material is set based on the state of the selection mode switching control, and then the selection state of the first multimedia material can be set as a prohibition selection state in the case of that the first multimedia material of the corresponding type is not available, which can improve the selection efficiency for the first multimedia material.

In some implementations, the method may further include: in response to receiving, from the user, the third operation triggered on any one of the at least one terminal album management control, changing a interface theme of the album interface to an album-associated-word; in response to receiving, from the user, the second operation triggered on the draft box interface switching control, changing the interface theme of the album interface to a draft-box-associated-word.

The album-associated-word is used to indicate that the multimedia material displayed in the content display area 504 belongs to the album of the terminal device, so as to facilitate the user to distinguish the second multimedia material belonging to the terminal album and the first multimedia material belonging to the draft box. Referring to FIG. 9 and FIG. 10, in response to receiving, from user, a click operation on the label 'All', the terminal device can replace the interface theme 508 in the album interface with the album-associated-word 'All Photos', in response to the user's click operation. In the same way, the draft-box-associated-word is used to indicate that the multimedia material displayed in the content display area 504 belongs to the draft box of the application. In response to receiving, from user, a click operation on the draft box interface switching control 502, the terminal device can replace the interface theme 508 in the album interface with the draft-box-associated-word 'Draft Box', in response to the user's click operation. In the example in which the interface theme 508 of the album interface is 'All Pictures', if the user clicks the draft box interface switching control 502, then the album-associated-word 'All Pictures' will be replaced with the draft-box-associated-word 'Draft Box'. in the example in which the interface theme 508 of the album interface is 'Draft Box', if the user clicks on the terminal album management control 503, draft-box-associated-word 'Draft Box' will be replaced with the album-associated-word 'All Pictures'. In actual use, replacing the interface theme of the album interface according to the user's third operation triggered on the terminal album management control and the user's second operation triggered on the draft box interface switching control can facilitate the user to distinguish the content displayed in the content display area.

Figure 11:
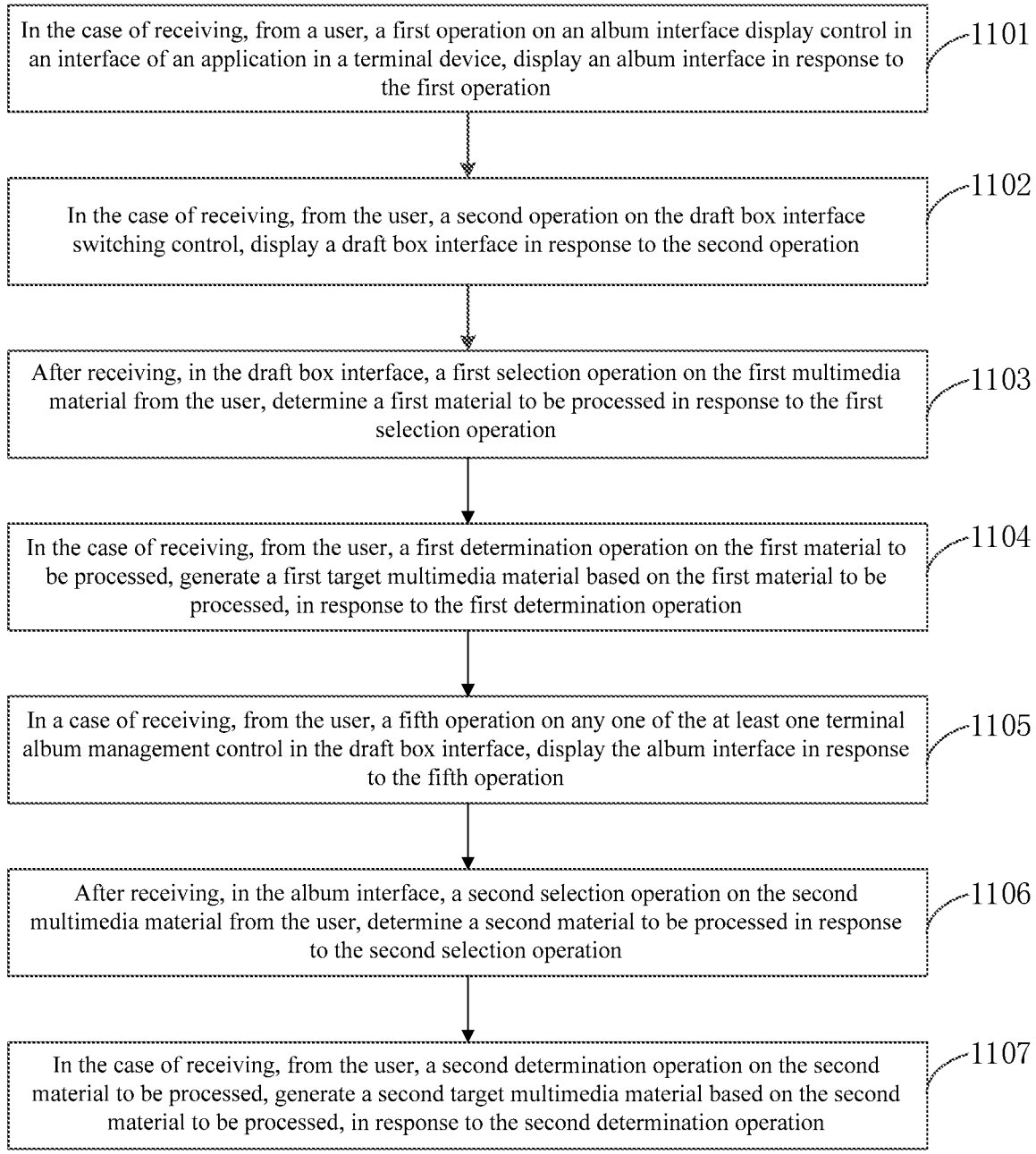
FIG. 11 is a flow chart showing another method for generating a multimedia material according to some example implementations.

FIG. 11 is a flowchart showing another method for generating a multimedia material according to some example implementations. The method may include the following operations In operation 1101, in the case of receiving, from a user, a first operation triggered on an album interface display control in an interface of an application in the terminal device, an album interface is displayed in response to the first operation.

In operation 1102, in the case of receiving, from the user, a second operation triggered on a draft box interface switching control, a draft box interface is displayed in response to the second operation.

In operation 1103, after receiving, from the user, a first selection operation on triggered a first multimedia material in the draft box interface, a first material to be processed is determined in response to the first selection operation.

In operation 1104, in the case of receiving, from the user, a first determination operation triggered on the first material to be processed, a first target multimedia material is generated based on the first material to be processed, in response to the first determination operation.

In operation 1105, in a case of receiving, from the user, a fifth operation triggered on any one of the at least one terminal album management control in the draft box interface, the album interface is displayed in response to the fifth operation.

The album interface includes a second multimedia material belonging to the album of the terminal device.

Figure 12:
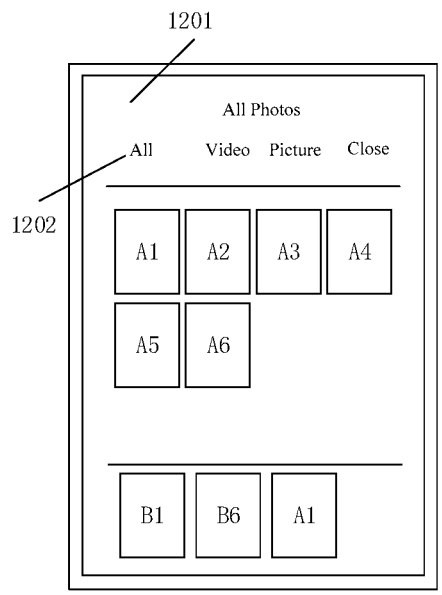
FIG. 12 is a schematic diagram showing yet another draft box interface in a terminal device according to some example implementations.

FIG. 12 is a schematic diagram showing a draft box interface in another terminal device according to some example implementations. The draft box interface 1201 may include at least one terminal album management control 1202. When receiving, in the draft box interface 1201, a fifth operation triggered on any of terminal album management controls from the user, the terminal device may display the album interface, in response to the fifth operation. Combined with the first implementation, as shown in FIG. 5 and FIG. 12, the user can click the terminal album management control 1202 in the draft box interface 1201, such as the label 'All', when the terminal device receives, from the user, a click operation on the label 'All' in the draft box interface 1201, the album interface 501 can be displayed. For example, the draft box interface 1201 as shown in FIG. 12 can be closed, and the album interface as shown in FIG. 5 can be opened. The specific process of displaying the album interface can be set according to requirements, which is not limited in the implementations.

In operation 1106, after receiving, in the album interface, a second selection operation triggered on the second multimedia material from the user, a second material to be processed is determined in response to the second selection operation.

In operation 1107, in the case of receiving, from the user, a second determination operation triggered on the second material to be processed, a second target multimedia material is generated based on the second material to be processed, in response to the second determination operation.

In some implementations, the method may also include: displaying an alternative area in a current display interface; in the case of determining the first material to be processed, displaying the first material to be processed in the alternative area; in the case of determining the second material to be processed, displaying the second material to be processed in the alternative area; and in the case of receiving, from the user, a third determination operation triggered on the alternative area, in response to the third determination operation, generating a third target multimedia material based on the multimedia material displayed in the alternative area.

In some implementations, after displaying the draft box interface, the alternative area can be displayed in the draft box interface. After the first material to be processed is determined, the first material to be processed can be displayed in the draft box interface (i.e., the current display interface). As shown in FIG. 12, the alternative area can be displayed in the draft box interface. After the first multimedia materials B1 and B6 (i.e., the first materials to be processed) are determined, the first materials to be processed can be displayed in the alternative area. Similarly, as shown in FIG. 10, after displaying the album interface, the alternative area can be displayed in the album interface. After the second material to be processed is determined, the determined to-be-processed second material can be displayed in the album interface (i.e., the current display interface). By displaying the alternative area in the current display interface, after determining the first material to be processed and the second material to be processed, the first material to be processed and the second material to be processed can be displayed in the alternative area at the same time, thus realizing the mixed selection of the first multimedia material and second multimedia material. The display method of the alternative area can be set according to requirements, which is not limited in the implementations.

In some implementations, the draft box interface can display the first multimedia material belonging to the draft box of the application, the album interface can display the second multimedia material belonging to the album of the terminal device. After the terminal device receiving, in the draft box interface, a first selection operation triggered on the first multimedia material from the user, a first material to be processed is determined in response to the first selection operation, and a first target multimedia material is generated based on the first material to be processed. After receiving, in the album interface, a second selection operation triggered on the second multimedia material from the user, a second material to be processed is determined in response to the second selection operation and a second target multimedia material is generated based on the second material to be processed. The method mentioned above solve the problems that users need to switch frequently between the album interface and the draft box interface when selecting the first multimedia material belonging to the draft box of the application and the second multimedia material belonging to the album of the terminal device, thus improve the generating efficiency of the multimedia material. Furthermore, the alternative area can be displayed in the current interface, the determined to-be-processed first material and to-be-processed second material can be simultaneously displayed in the alternative area, and the third target multimedia material is generated according to the first material to be processed and/or the second material to be processed in the alternative area, thus realizing the mixed selection of the first multimedia material and the second multimedia material, providing users with more multimedia materials at the same time, and improving the user's creative experience.

Figure 13:
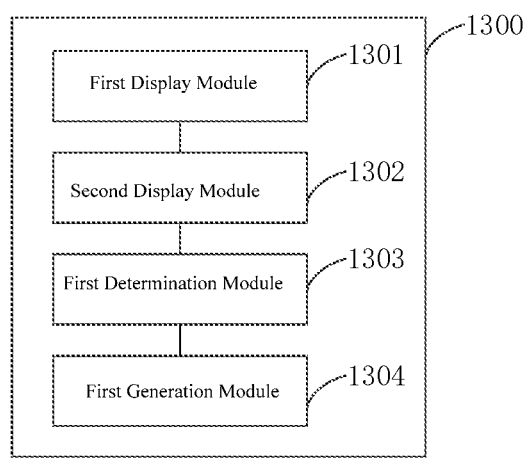
FIG. 13 is a block diagram showing an apparatus for generating a multimedia material according to some example implementations.

FIG. 13 is a block diagram of an apparatus for generating a multimedia material according to some example implementations. The apparatus 1300 can be applied to the generation of the multimedia material, and can include a first display module 1301, a second display module 1302, a first determination module 1303, and a first generation module 1304.

The first display module 1301 is configured to in the case of receiving, from a user, a first operation triggered on an album interface display control in an interface of an application in a terminal device, displaying an album interface in response to the first operation, the album interface including a draft box interface switching control of the application and at least one terminal album management control;

The second display module 1302 is configured to in the case of receiving, from the user, a second operation triggered on the draft box interface switching control, displaying a draft box interface in response to the second operation, the draft box interface including at least one first multimedia material belonging to a draft box of the application;

The first determination module 1303 is configured to after receiving, in the draft box interface, a first selection operation triggered on the first multimedia material from the user, in response to the first selection operation, determining a first material to be processed; and The first generation module 1304 is configured to in the case of receiving, from the user, a first determination operation triggered on the first material to be processed, in response to the first determination operation, generating a first target multimedia material based on the first material to be processed.

In some implementations, in the case of receiving, from a user, a first operation triggered on an album interface display control in an interface of an application in the terminal device, displaying an album interface including a draft box interface switching control of the application, in response to the first operation; in the case of receiving, from the user, a second operation triggered on the draft box interface switching control, displaying a draft box interface including a first multimedia material belonging to the draft box of the application, in response to the second operation; after receiving, in the draft box interface, a first selection operation triggered on the first multimedia material, determining a first material to be processed in response to the first selection operation; in the case of receiving, from the user, a first determination operation triggered on the first material to be processed, generating a first target multimedia material based on the first material to be processed, in response to the first determination operation. By setting the draft box interface switching control the application in the album interface, in the case of receiving the first operation of the draft box interface switching control, the draft box interface of the application can be displayed, so that the user can directly enter the draft box interface of the application from the album interface. Furthermore, the first target multimedia material is generated based on the first multimedia material in the draft box interface, which is convenient for users to use the first multimedia material belonging to the draft box of the application to generate the target multimedia material, and improves the production efficiency of multimedia materials.

In some implementations, the second display module 1302 is configured to replace content of a content display area in the album interface with the draft box interface.

In some implementations, the apparatus further includes a replacement module, a second determination module, and a second generation module.

The replacement module is configured to in the case of receiving, from the user, a third operation triggered on any one of the at least one terminal album management control, replace the content of the content display area in the album interface with at least one second multimedia material belonging to an album in the terminal device, in response to the third operation.

The second determination module is configured to after receiving, in the content display area, a second selection operation triggered on the second multimedia material from the user, determine a second material to be processed in response to the second selection operation.

The second generation module is configured to in the case of receiving, from the user, a second determination operation triggered on the second material to be processed, in response to the second determination operation, generate a second target multimedia material based on the second material to be processed.

In some implementations, the apparatus 1300 further includes a third display module and a third generation module.

The third display module is configured to: display an alternative area in the content display area; in response to determining the first material to be processed, display the first material to be processed in the alternative area; in response to determining the second material to be processed, display the second material to be processed in the alternative area.

The third generation module is configured to in the case of receiving, from the user, a third determination operation triggered on the alternative area, in response to the third determination operation, generate a third target multimedia material based on the multimedia material displayed in the alternative area.

In some implementations, the apparatus 1300 may include a fourth display module and a switching module.

The fourth display module is configured to in the case of receiving, from the user, a second operation triggered on the draft box interface switching control, display a selection mode switching control in the album interface.

The switching module is configured to after receiving, from the user, a fourth operation triggered on the selection mode switching control, switch a selection mode of the first multimedia material in the draft box interface in response to the fourth operation.

In some implementations, a state of the selection mode switching control includes a first state and a second state.

The switching module is further configured to in the case that the selection mode switching control is in the first state, in response to receiving the fourth operation, switch the selection mode switching control into the second state, and switch the selection mode into a mixed selection mode; and in the case that the selection mode switching control is in the second state, in response to receiving the fourth operation, switch the selection mode switching control into the first state, and switch the selection mode into a single selection mode.

In some implementations, each state of the selection mode switching control supports a selection for a preset type of first multimedia material; the apparatus further includes a prohibition module.

The prohibition module is configured to in any state, set a first multimedia material that does not belong to the preset type corresponding to the state among the at least one first multimedia material as a prohibition selection.

In some implementations, the draft box interface including at least one terminal album management control; and the apparatus 1300 further includes a fifth display module, a third determination module and a fourth generation module.

The fifth display module is configured to in the case of receiving, in the draft box interface, a fifth operation triggered on any of the at least one terminal album management control from the user, display the album interface in response to the fifth operation, and the album interface including at least one second multimedia material belonging to an album of the terminal device.

The third determination module is configured to after receiving, in the album interface, a second selection operation triggered on the second multimedia material from the user, determine a second material to be processed in response to the second selection operation.

The fourth generation module is configured to in the case of receiving, from the user, a second determination operation triggered on the second material to be processed, in response to the second determination operation, generate a second target multimedia material based on the second material to be processed.

In some implementations, the apparatus 1300 further includes a sixth display module and a fifth generation module.

The sixth display module is configured to: display an alternative area in a current display interface; in response to determining the first material to be processed, display the first material to be processed in the alternative area; and in response to determining the second material to be processed, display the second material to be processed in the alternative area.

The fifth generation module is configured to in the case of receiving, from the user, a third determination operation triggered on the alternative area, in response to the third determination operation, generate a third target multimedia material based on the multimedia material displayed in the alternative area.

Figure 14:
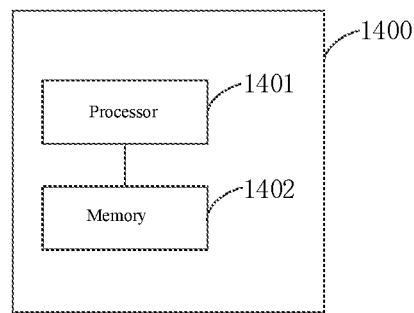
FIG. 14 is a block diagram showing a device for generating a multimedia material according to some example implementations.

FIG. 14 is a block diagram showing a device for generating a multimedia material according to some example implementations. The device for generating the multimedia material includes: a processor 1401; and a memory 1402 for storing instructions executable by the processor 1401. The processor 1401 is configured to execute the instructions, so as to implement the method for generating the multimedia material shown in FIG. 3, FIG. 7 or FIG. 11.

In some example implementations, a storage medium including instructions is also provided, such as a memory 1402 including instructions. The instructions may be executed by the processor 1401 of the device 1400 for generating the multimedia material to perform the method for generating the multimedia material shown in FIG. 3, FIG. 7 or FIG. 11.

Alternatively, the storage medium may be a non-transitory computer-readable storage medium, for example, the non-transitory computer-readable storage medium may be read only memory (ROM), random access memory (RAM), CD-ROM, magnetic tape, floppy disk, and optical data storage device etc.

In some example implementations, a computer program product containing instructions is also provided, which when run on a computer, causes the computer to execute the method for generating multimedia material in the implementations shown in FIG. 1, FIG. 7 or FIG. 11.

Figure 15:
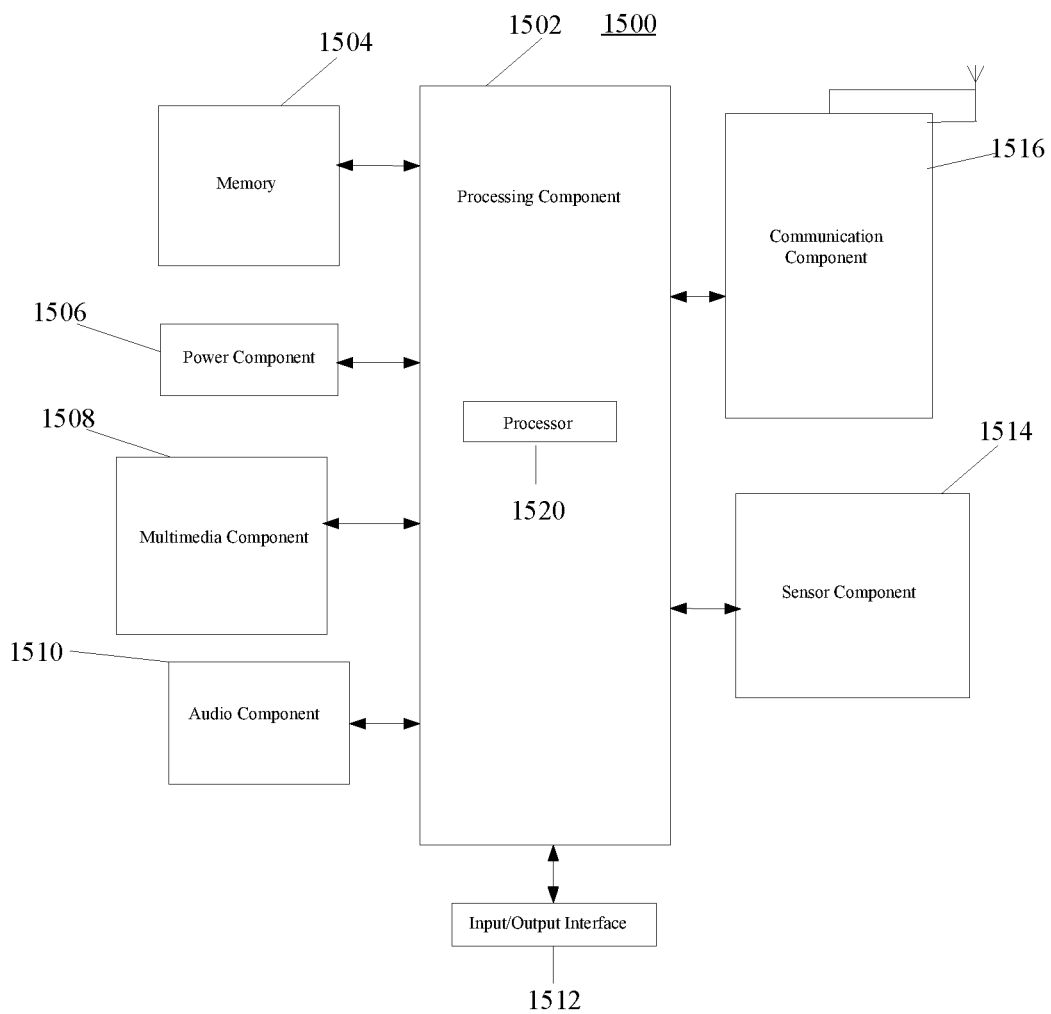
FIG. 15 is a block diagram showing another device for generating a multimedia material according to some example implementations.

FIG. 15 is a block diagram showing another device for generating a multimedia material according to some example implementations. The device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls the overall operations of the device 1500, such as the operations associated with display, telephone calls, data communications, camera operations, and recording operations. The processing component 1502 can include one or more processors 1520 to execute instructions, so as to complete all or part of the operations of the above-mentioned method for generating a multimedia material. In addition, the processing component 1502 can include one or more modules to facilitate the interaction between the processing component 1502 and other components. For example, the processing component 1502 can include a multimedia module to facilitate the interaction between the multimedia component 1508 and the processing component 1502.

The memory 1504 is configured to store various types of data to support the operation of the device 1500. Examples of such data include instructions for any application or method operated on the device 1500, such as the contact data, the phone book data, messages, pictures, videos, and the like. The memory 1504 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1506 provides power to various components of the device 1500. The power component 1506 can include a power management system, one or more power sources, and other components associated with the generation, management, and distribution of power in the electronic device 1500.

The multimedia component 1508 includes a screen providing an output interface between the device 1500 and the user. In some implementations, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some implementations, the multimedia component 1508 includes a front camera and/or a rear camera. When the device 1500 is in an operation mode, such as a photographing mode or a video mode, the front camera and/or the rear camera can receive external multimedia data. Each of the front camera and the rear camera may be a fixed optical lens system or have focus and optical zoom capability.

The audio component 1510 is configured to output and/or input an audio signal. For example, the audio component 1510 includes a microphone (MIC) configured to receive an external audio signal when the electronic device 1500 is in an operation mode, such as a call mode, a recording mode, and a voice recognition mode. The received audio signal may be further stored in the memory 1504 or sent via the communication component 1516. In some implementations, the audio component 1510 also includes a speaker for outputting the audio signal.

The I/O interface 1512 provides an interface between the processing component 1502 and peripheral interface modules, such as a keyboard, a click wheel, buttons, and the like. These buttons may include, but are not limited to, a home button, a volume button, a starting button, and a locking button.

The sensor component 1514 includes one or more sensors for providing status assessments of various aspects of the device 1500. For example, the sensor component 1514 can detect an open/closed status of the device 1500, relative positioning of components, such as the display and the keypad of the electronic device 1500. The sensor component 1514 can also detect a change in position of one component of the device 1500 or the device 1500, the presence or absence of user contact with the device 1500, an orientation, or an acceleration/deceleration of the device 600, and a change in temperature of the device 1500. The sensor component 1514 can include a proximity sensor configured to detect the presence of nearby objects without any physical contact. The sensor component 1514 can also include a light sensor, such as a CMOS or CCD image sensor, configured to use in imaging applications. In some implementations, the sensor component 1514 can also include an accelerometer sensor, a gyroscope sensor, a magnetic sensor, a pressure sensor, or a temperature sensor.

The communication component 1516 is configured to facilitate wired or wireless communication between the device 1500 and other devices. The device 1500 can access a wireless network based on a communication standard, such as WiFi, an operator network (such as 2G, 3G, 4G or 5G), or a combination thereof. In an example implementation, the communication component 1516 receives broadcast signals or broadcast associated information from an external broadcast management system via a broadcast channel. In an example implementation, the communication component 1516 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an example implementation, the device 1500 may be implemented with one or more application specific integrated circuits (ASICs), digital signal processors (DSPs), digital signal processing devices (DSPDs), programmable logic devices (PLDs), field programmable Gate array (FPGA), controllers, microcontrollers, microprocessors or other electronic components to perform the above method.

In an example implementation, there is also provided a non-transitory computer-readable storage medium including instructions, such as a memory 1504 including instructions executable by the processor 1520 of the device 1500 to perform the above described method. For example, the non-transitory computer readable storage medium may be a read only memory (ROM), a random access memory (RAM), a CD-ROM, a magnetic tape, a floppy disc, and an optical data storage device.

The above-mentioned implementations may be implemented in whole or in part by software, hardware, firmware, or any combination thereof. When implemented by software, it can be implemented in the form of a computer program product in whole or in part.

The computer program product includes one or more computer instructions. When the computer program instructions are loaded and executed on the computer, all or part of the processes or functions described in the implementations of the disclosure are generated. The computer may be a general-purpose computer, a dedicated computer, a computer network, or other programmable devices. The computer instructions may be stored in a computer-readable storage medium or transmitted from one computer-readable storage medium to another computer-readable storage medium. For example, the computer instructions may be transmitted from a website, computer, server, or data center to another website, computer, server or data center via a wired way (such as coaxial cable, optical fiber, digital subscriber line (DSL)) or a wireless way (such as infrared, wireless, microwave, etc.). The computer-readable storage medium may be any available medium that can be stored by a computer or a data storage device such as a server or data center integrated with one or more available media. The computer-readable storage medium may be a magnetic medium (for example, a floppy disk, a hard disk, and a magnetic tape), an optical medium (for example, a DVD), or a semiconductor medium (for example, a solid state disk (SSD)).

Those skilled in the art can clearly understand that, for the convenience and conciseness of the description, the specific working process of the above-described system, device, and unit can refer to the corresponding process in the foregoing method implementation, which will not be repeated here.

In the several implementations provided in the disclosure, it should be understood that the disclosed system, device, and method may be implemented in other ways. For example, the device implementations described above are merely illustrative. For example, the division of the units is only a logical function division, and there may be other divisions in actual implementation, for example, multiple units or components may be combined or may be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the implementations.

In addition, the functional units in the various implementations of the disclosure may be integrated into one processing unit, or each unit may exist alone physically, or two or more units may be integrated into one unit. The above-mentioned integrated unit can be realized in the form of hardware or software functional unit.

If the integrated unit is implemented in the form of a software functional unit and sold or used as an independent product, it can be stored in a computer readable storage medium. Based on this understanding, the technical solution of the disclosure essentially or the part that contributes to the existing technology or all or part of the technical solution can be embodied in the form of a software product, and the computer software product is stored in a storage medium, which including several instructions to make a computer device (which can be a personal computer, a server, or a network device, etc.) execute all or part of the operations of the methods described in each implementation of the disclosure. The aforementioned storage media may include U flash disk, mobile hard disk, read-only memory (ROM), random access memory (RAM), magnetic disk or optical disk and other media that can store program code.

As for the device implementation, since it is basically similar to the method implementation, the description thereof is relatively simple, and for related parts, please refers to the part of the description of the method implementation.

Those skilled in the art will easily think of other implementations of the disclosure after considering the specification and practicing the present disclosure. This disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the implementations are only regarded as example, and the true scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A method for generating a multimedia material, comprising:
displaying an album interface in response to receiving a first operation, the first operation triggered on an album interface display control in an interface of an application in a terminal device, wherein the album interface comprises a draft box interface switching control of the application and at least one terminal album management control, and the at least one terminal album management control is configured to display at least one second multimedia material belonging to an album in the terminal device in response to a third operation from a user;
switching the album interface into a draft box interface of the application in response to receiving a second operation, the second operation triggered on the draft box interface switching control, wherein the draft box interface comprises at least one first multimedia material belonging to a draft box of the application;
determining a first material in response to receiving a first selection operation in the draft box interface, the first selection operation triggered on the first multimedia material from the user;
generating a first target multimedia material based on the first material in response to receiving a first determination operation, the first determination operation triggered on the first material;
displaying a selection mode switching control in the album interface in response to receiving the second operation triggered on the draft box interface switching control; and
switching a selection mode of the first multimedia material in the draft box interface in response to receiving a fourth operation triggered on the selection mode switching control.

2. The method according to claim 1, wherein said switching the album interface into the draft box interface comprising replacing content of a content display area in the album interface with the draft box interface.

3. The method according to claim 2, the method further comprising:
replacing the content of the content display area in the album interface with the at least one second multimedia material belonging to the album in the terminal device in response to receiving a third operation, the third operation triggered on any one of the at least one terminal album management control from the user;
determining a second material in response to receiving a second selection operation in the content display area, the second selection operation triggered on the second multimedia material from the user; and
generating a second target multimedia material based on the second material in response to receiving a second determination operation, the second determination operation triggered on the second material.

4. The method according to claim 3, wherein after displaying the album interface, the method further comprising:
displaying an alternative area in the content display area;
displaying the first material in the alternative area in response to determining the first material;
displaying the second material in the alternative area in response to determining the second material; and
generating a third target multimedia material based on the multimedia material displayed in the alternative area, in response to receiving a third determination operation triggered on the alternative area.

5. The method according to claim 1, wherein a state of the selection mode switching control comprises a first state and a second state,
switching the selection mode switching control into the second state and switching the selection mode into a mixed selection mode, in response to the selection mode switching control is in the first state and receiving the fourth operation; and
switching the selection mode switching control into the first state and switching the selection mode into a single selection mode, in response to the selection mode switching control is in the second state and receiving the fourth operation.

6. The method according to claim 5, wherein a selection for a kind of first multimedia material is supported by each state of the selection mode switching control, and the method furthering comprising:
in any state, setting a first multimedia material that does not belong to the kind corresponding to the state among the at least one first multimedia material as a prohibition selection.

7. The method according to claim 1, wherein the draft box interface comprises at least one terminal album management control, and the method further comprising:
displaying the album interface in response to receiving a fifth operation in the draft box interface, the fifth operation triggered on any of the at least one terminal album management control, and the album interface comprises at least one second multimedia material belonging to an album of the terminal device;
determining a second material in response to receiving a second selection operation in the album interface, the second selection operation triggered on the second multimedia material from the user; and
generating a second target multimedia material based on the second material, in response to receiving a second determination operation triggered on the second material.

8. The method according to claim 7, the method further comprising:
displaying an alternative area in a current display interface;
displaying the first material in the alternative area in response to determining the first material;
displaying the second material in the alternative area in response to determining the second material; and
generating a third target multimedia material based on the multimedia material displayed in the alternative area, in response to receiving a third determination operation triggered on the alternative area.

9. A device for generating a multimedia material, comprising:
a processor; and
a memory for storing instructions executable by the processor;
wherein, the processor is configured to execute the instructions to implement a method for generating a multimedia material,
the processor is configured to:
display an album interface in response to receiving a first operation, the first operation triggered on an album interface display control in an interface of an application in a terminal device, wherein the album interface comprises a draft box interface switching control of the application and at least one terminal album management control, and the at least one terminal album management control is configured to display at least one second multimedia material belonging to an album in the terminal device in response to a third operation from a user;

switch the album interface into a draft box interface of the application in response to receiving a second operation, the second operation triggered on the draft box interface switching control, wherein the draft box interface comprises at least one first multimedia material belonging to a draft box of the application;

determine a first material in response to receiving a first selection operation in the draft box interface, the first selection operation triggered on the first multimedia material from the user;

generate a first target multimedia material based on the first material in response to receiving a first determination operation, the first determination operation triggered on the first material;

display a selection mode switching control in the album interface in response to receiving the second operation triggered on the draft box interface switching control; and switch a selection mode of the first multimedia material in the draft box interface in response to receiving a fourth operation triggered on the selection mode switching control.

10. The device according to claim 9, wherein the processor is configured to replace content of a content display area in the album interface with the draft box interface.

11. The device according to claim 10, wherein the processor is further configured to:

replace the content of the content display area in the album interface with at least one second multimedia material belonging to the album in the terminal device in response to receiving a third operation, the third operation triggered on any one of the at least one terminal album management control from the user;

determine a second material in response to receiving a second selection operation in the content display area, the second selection operation triggered on the second multimedia material from the user; and generate a second target multimedia material based on the second material in response to receiving a second determination operation, the second determination operation triggered on the second material.

12. The device according to claim 11, wherein the processor is further configured to:

display an alternative area in the content display area;

display the first material in the alternative area in response to determining the first material;

display the second material in the alternative area in response to determining the second material; and generate a third target multimedia material based on the multimedia material displayed in the alternative area, in response to receiving a third determination operation triggered on the alternative area.

13. The device according to claim 9, wherein a state of the selection mode switching control comprising a first state and a second state, switch the selection mode switching control into the second state and switching the selection mode into a mixed selection mode, in response to the selection mode switching control is in the first state and receiving the fourth operation;

switch the selection mode switching control into the first state and switching the selection mode into a single selection mode, in response to the selection mode switching control is in the second state and receiving the fourth operation.

14. The device according to claim 13, wherein a selection for a kind of first multimedia material is supported by each state of the selection mode switching control, and the processor is further configured to:

in any state, set a first multimedia material that does not belong to the kind corresponding to the state among the at least one first multimedia material as a prohibition selection.

15. The device according to claim 9, wherein the draft box interface comprises at least one terminal album management control, and the processor is further configured to:

display the album interface in response to receiving a fifth operation in the draft box interface, the fifth operation triggered on any of the at least one terminal album management control, and the album interface comprises at least one second multimedia material belonging to an album of the terminal device;

determine a second material in response to receiving a second selection operation in the album interface, the second selection operation triggered on the second multimedia material from the user; and generate a second target multimedia material based on the second material, in response to receiving a second determination operation triggered on the second material.

16. The device according to claim 15, wherein the processor is configured to:

display an alternative area in a current display interface;

display the first material in the alternative area in response to determining the first material;

display the second material in the alternative area in response to determining the second material; and generate a third target multimedia material based on the multimedia material displayed in the alternative area, in response to receiving a third determination operation triggered on the alternative area.

17. A non-transitory computer storage medium having a computer instruction stored thereon, when the computer instruction being executed by a processor of a device for generating a multimedia material, enable the device to implement a method for generating a multimedia material, the method comprising:

displaying an album interface in response to receiving a first operation, the first operation triggered on an album interface display control in an interface of an application in a terminal device, wherein the album interface comprises a draft box interface switching control of the application and at least one terminal album management control, and the at least one terminal album management control is configured to display at least one second multimedia material belonging to an album in the terminal device in response to a third operation from a user;

switching the album interface into a draft box interface of the application in response to receiving a second operation, the second operation triggered on the draft box interface switching control, wherein the draft box interface comprises at least one first multimedia material belonging to a draft box of the application;

determining a first material in response to receiving a first selection operation in the draft box interface, the first selection operation triggered on the first multimedia material from the user;

generating a first target multimedia material based on the first material in response to receiving a first determination operation, the first determination operation triggered on the first material;

displaying a selection mode switching control in the album interface in response to receiving the second operation triggered on the draft box interface switching control; and switching a selection mode of the first multimedia material in the draft box interface in response to receiving a fourth operation triggered on the selection mode switching control.

* * * * *